(12) United States Patent
Kulkarni et al.

(10) Patent No.: US 8,179,142 B2
(45) Date of Patent: May 15, 2012

(54) TRAILER SIGNAL CONVERTER

(75) Inventors: Chandrakumar Kulkarni, Battle Creek, MI (US); Joseph B. Wells, Jackson, MI (US)

(73) Assignee: Cequent Electric Products, Tekonsha, MI (US)

( * ) Notice: Subject to any disclaimer, the term of this patent is extended or adjusted under 35 U.S.C. 154(b) by 238 days.

(21) Appl. No.: 12/381,340

(22) Filed: Mar. 11, 2009

(65) Prior Publication Data
US 2009/0302858 A1 Dec. 10, 2009

Related U.S. Application Data

(60) Provisional application No. 61/068,992, filed on Mar. 11, 2008.

(51) Int. Cl.
*G01R 31/02* (2006.01)
(52) U.S. Cl. ........................................... 324/504
(58) Field of Classification Search .................. 324/504; 701/69, 70
See application file for complete search history.

(56) References Cited

U.S. PATENT DOCUMENTS

| | | | |
|---|---|---|---|
| 3,970,860 A | 7/1976 | Purdy | |
| 4,398,252 A * | 8/1983 | Frait | 701/70 |
| 4,751,431 A | 6/1988 | Ducote | |
| 4,845,465 A | 7/1989 | Kruse et al. | |
| 4,939,503 A | 7/1990 | Swanson | |
| 5,030,938 A | 7/1991 | Bondzeit | |
| 5,397,924 A | 3/1995 | Gee et al. | |
| 5,498,910 A | 3/1996 | Hopkins et al. | |
| 5,521,466 A | 5/1996 | Vincent | |
| 5,615,930 A * | 4/1997 | McGrath et al. | 303/7 |
| 5,693,985 A | 12/1997 | Gee et al. | |
| 5,701,116 A | 12/1997 | Hoekstra | |
| 5,760,545 A | 6/1998 | Mikel | |
| 5,767,589 A | 6/1998 | Lake et al. | |
| 6,087,777 A | 7/2000 | Long | |
| 6,130,487 A | 10/2000 | Bertalan et al. | |
| 6,177,865 B1 | 1/2001 | Bryant et al. | |
| 6,232,722 B1 | 5/2001 | Bryant et al. | |
| 6,420,832 B2 | 7/2002 | Rabine | |
| 6,545,600 B1 | 4/2003 | Boner | |
| 7,064,658 B2 | 6/2006 | Burlak et al. | |
| 7,268,693 B2 | 9/2007 | Bell et al. | |
| 2002/0123837 A1* | 9/2002 | Eccleston et al. | 701/70 |
| 2005/0127747 A1* | 6/2005 | Robertson | 303/20 |
| 2008/0203975 A1 | 8/2008 | Burlak et al. | |

* cited by examiner

*Primary Examiner* — Vincent Q Nguyen
(74) *Attorney, Agent, or Firm* — McDonald Hopkins LLC

(57) ABSTRACT

A signal converter and method of converting a signal are provided. The converter includes a power supply, microcontroller and current sensor. The microcontroller is connected to a power supply and is configured to receive inputs from a vehicle and output signals to loads of a second vehicle. The sensor is connected to the microcontroller to monitor current flow at the loads. The output channels are configured to stagger activity on the output signals. The microcontroller reduces the duty cycle of the output signals if the current flow rises above a first threshold and resumes the output signal to full strength once the current flow falls below a second threshold. The method includes receiving an input signal, sending an output signal, measuring current flow, measuring temperature, reducing the power of the output signal, and restoring the output signal.

33 Claims, 1 Drawing Sheet

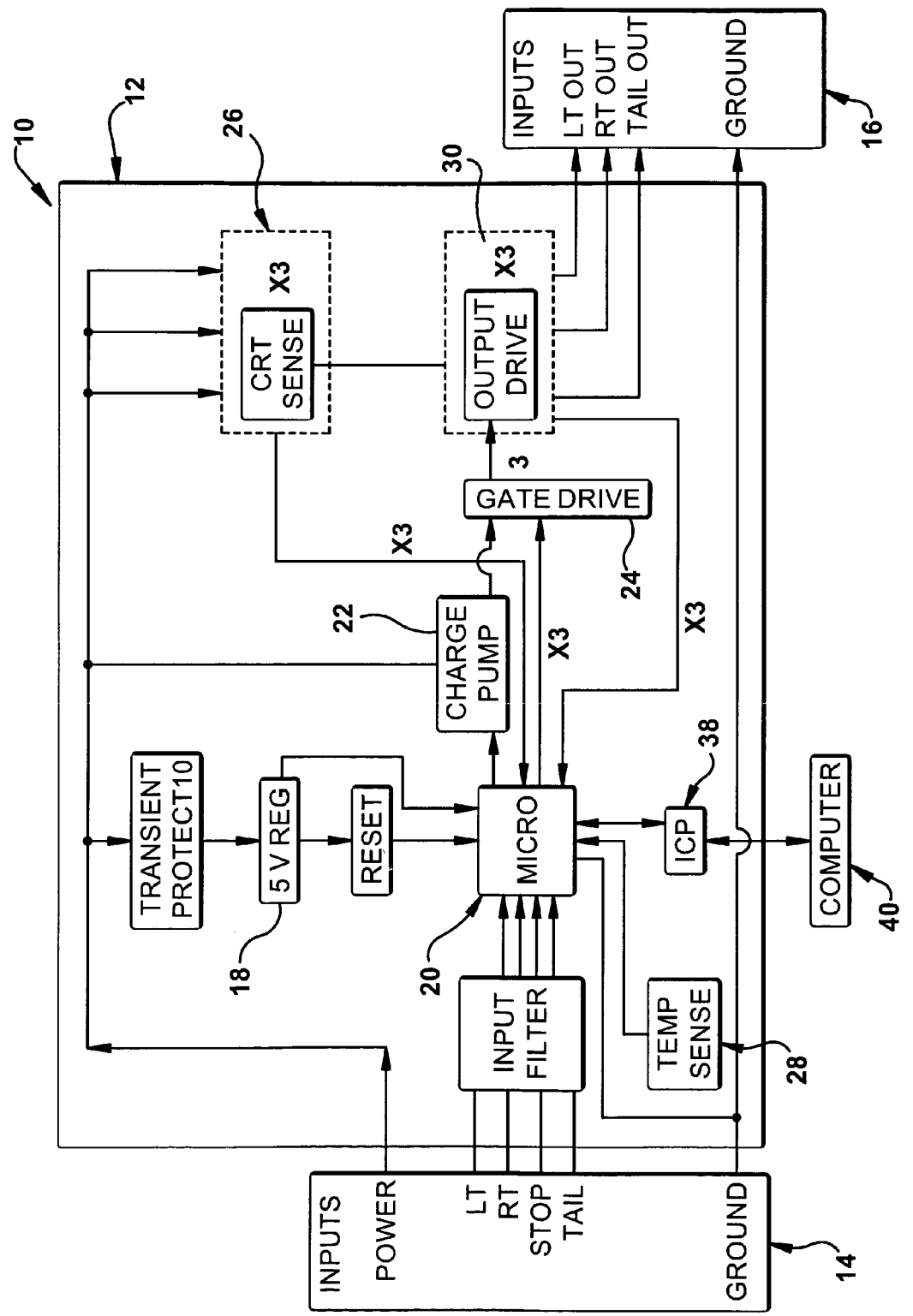

TRAILER SIGNAL CONVERTER

CROSS-REFERENCE TO RELATED APPLICATIONS

This application claims benefit from U.S. Provisional Patent Application No. 61/068,992, entitled "Trailer Signal Converter," filed on Mar. 11, 2008, which is hereby incorporated in its entirety by reference.

FIELD OF THE INVENTION

The present invention relates to a device for transmitting and converting signals, and more specifically to a device for transmitting and converting signals from a towing vehicle to a towed vehicle.

BACKGROUND OF THE INVENTION

Towed vehicles, such as trailers, have brake signals that operate based on the braking signals of the towing vehicle. As is well known in the art, the braking signals of the towing vehicle are electrically connected to the braking system of the towed vehicle, such as via an electrical adapter, or the like. Typically, the signaling system of the towing vehicle has a signal lamp and a brake lamp that are operated by at least two separate filaments. However, most trailer signal systems usually combine the turn and brake signals into a single lamp with a single filament. Accordingly, an adapter or circuitry is required in order to interface the signal system of the towing vehicle with the signal system of the towed vehicle or trailer.

Adapters that interface the signaling system of the towing vehicle and their respective towed vehicle or trailer are well known. Most adapters use the power from the signal system of the towing vehicle to power the signaling system of the towed vehicle. In order to accomplish this, the adapter must increase the amount of current from the towing vehicle signaling system to the towed vehicle signaling system. However, there are many disadvantages to such adapters.

One such disadvantage of known converters is that they do not have adequate safety and back-up features. For example, traditional converters typically do not have adequate overload and short circuit protection. As a result, traditional converters present a risk due to overheating should the load on the output exceed the rated load. Frequently, towed vehicles or trailers may have marking lights added to the taillights, for example, that may further increase the load on the output of the tail channel of the signaling system and, thus, the probability of exceeding the rated load of the output is quite possible. Traditional converters that have a means to detect short circuits may not have an automatic reset function wherein upon removal of the short circuit the converter starts normal operation.

Moreover, known adapters or converters fail to adequately protect the adapter if the load at the output exceeds the ratings of the converter. The failed attempts of known converters involve implementing thermal protection on the output driver. However, the thermal protection of the converter is a remedial measure. Thermal protection does not prevent the potential or eventual problem that causes overheating. Additionally, these known converters fail to detect short circuits and, as a result, can be damaged due to short circuit conditions.

Devices have also been developed that illuminate the signaling system of the towed vehicle with power signals separate from the towing vehicle signaling system. For example, solid state switching devices, such as transistors, relay coils, or other types of signal detection devices, may be used. However, these devices also have many disadvantages. For example, these devices can be damaged due to high power dissipation such as caused by high currents during overload or short circuit.

The towing vehicles may use a single bulb to indicate STOPLIGHT and TAILLIGHT functions. This is done by driving the light continuously for STOPLIGHT and for a partial time for TAILLIGHT. When a towed vehicle with known converters is connected to such towing vehicles, the TAILLIGHT may not function properly, may be very dim or flash.

Thus, the known converters are not capable of driving the lighting system of a towed vehicle to indicate a combined STOPLIGHT and TAILLIGHT bulb or light system. In addition, the prior art utilizes "smart drivers" that integrate all functions of a charge pump, current sense, temperature sense, or combinations thereof onto a single die. That makes the cost of these "smart drivers" very expensive. Not to mention that the consumer must take these drivers with all of the manufacturers specifications without a choice or any options. If the functions were separated, they could be tailored or fine tuned by the consumer for the specific application they were purchased for.

Therefore, there is a need in the art for an improved trailer signal converter or adapter. The present invention seeks to overcome many of the shortcomings of known adapters and circuitry for connecting the signaling system of the towing vehicle with the signaling system of the towed vehicle.

DESCRIPTION OF THE DRAWING

Objects and advantages together with the operation of the invention may be better understood by reference to the following detailed description taken in connection with the following illustration, wherein:

FIG. 1 illustrates a block diagram of an apparatus and system for connecting the signaling system of a towing vehicle to the signaling system of a towed vehicle in an embodiment of the present invention.

SUMMARY OF THE INVENTION

A signal converter that may include a power supply, a microcontroller and a current sensing device. The microcontroller may be connected to the power supply, and may be configured to receive a plurality of inputs from a first vehicle, and output a plurality of output signals to one or more loads of a second vehicle. The current sensing device may be connected to the microcontroller to monitor current flow at the loads. In addition, the microcontroller may be capable of reducing the duty cycle of the output signal in response to the current flow rising above a first predetermined threshold, and resuming the output signal to full strength once the current flow falls bellow a second predetermined threshold.

A signal converter that may include a power supply, a microcontroller and a current sensing device. The microcontroller may be connected to the power supply. The microcontroller may also include a plurality of input channels to receive input signals from a first vehicle and a plurality of output channels to send output signals to one or more output devices of a second vehicle. The current sensing device may be connected to the microcontroller to monitor the current drawn by the output devices. The output channels may be configured to stagger activity on the output signals. In addition, the microcontroller may be capable of limiting the power of the output signals in response to the current draw rising above a first predetermined threshold, and resuming the output signal to full strength once the current draw falls bellow a second predetermined threshold.

A method of converting a signal that may include receiving an input signal, sending an output signal, measuring current flow, measuring temperature, reducing the power of the output signal, and restoring the output signal. The output signal may be received from a first vehicle at an input channel of a microcontroller on a signal converting device. The output signal may be sent to an output device of a second vehicle from an output channel of the microcontroller in response to said input signal. The current flow may be measured at the load while the output signal is being sent to determine the presence of a circuit fault. The temperature of the signal converting device may be measured. The power of the output signal may be reduced in response to a circuit fault or in response to the temperature rising above a first predetermined threshold. The output signal may be restored to full strength once the circuit fault is removed and the temperature is below a second predetermined threshold.

DETAILED DESCRIPTION

While the invention is described herein with reference to several embodiments, it should be clear that the invention should not be limited only to the embodiments disclosed or discussed. The description of the embodiments herein is illustrative of the invention and should not limit the scope of the invention as described or claimed.

With reference to FIG. 1, an embodiment of an adapter or trailer signal converter 10 is provided. The adapter 10 may be used to transmit signals and/or convert signals from a signaling system of a towing vehicle to a signaling system of a towed vehicle or trailer. The towing vehicle may be, for example, an automobile, a truck, a tractor or any other appropriate type of towing vehicle having a signaling system. The towed vehicle may be a cargo trailer, a livestock trailer, a vehicle trailer or any other appropriate type trailer or vehicle capable of being towed that has a signaling system, such as a brake and/or turn signal.

Unlike the prior art, the adapter or trailer signal converter 10 may detect the presence of overload and short circuit and takes action to protect the converter 10 from overheating. The adapter 10 may do so by reducing the duty cycle of the output drive. In addition, should the fault in the output be removed, the converter 10 may automatically detect that without resetting it and start driving the output loads normally again. In addition, the trailer signal converter 10 may also separate the control of various functions, such as a current sense, charge pump, power drive with low heat dissipation and temperature sensing, and the like, for example, so that the consumer may tailor them to their own specifications or fine tune the functions for a specific application.

The trailer signal converter or adapter 10 may include a circuit board 12 having an input 14 and an output 16. As illustrated in FIG. 1, the adapter 10 may have the input 14 on one side of the circuit board 12 and the output 16 on the opposing side of the circuit board 12. It is to be understood, however, that the input 14 and the output 16 may be positioned at any appropriate location on the circuit board, such as on the same side of the circuit board 12. The input and the output 16 may also be implemented by using one or more connectors (not shown).

The circuit board 12 may be assembled into a box (not shown) and potted using any appropriate type of material. Preferably, the circuit board 12 may be potted using a material that is suitable to protect the components from thermal cycling. In addition, the circuit board 12 may be overmolded as an alternative. In use, the box may be mounted or otherwise positioned in the interior or on the exterior of a towing vehicle.

A power supply 18 may be incorporated into the circuit board 12. The power supply 18 may be of any appropriate type, but the power supply 18 may preferably be derived from the power supply of the towing vehicle. The power supply 18 may power a microcontroller 20 and the associated circuits of the trailer signal converter or adapter 10, as shown in FIG. 1. The power supply of the towing vehicle may also provide power to the adapter 10 and may work in combination with the power supply 18 to power the adapter 10.

The microcontroller 20 may store data, such as a program, or the like, in memory, such as, flash memory, for example. The data may be software that may be utilized to control the operation of the trailer signal converter or adapter 10. The input 14 may be in communication with the microcontroller 20. For example, the microcontroller 20 may analyze signals from the input 14. The signals at the input 14 may be defined by channels, such as a left turn channel, a right turn channel, a stop light channel, a tail channel, a backup channel, and the like.

The output channels 16 may be activated or turned on at staggering intervals or times in order to reliably detect problematic conditions that may exist at the output 16 of the adapter or trailer signal converter 10, such as an over load or a short circuit. In an embodiment, the microcontroller 20 may implement "exclusive OR" logic with STOPLIGHT and TURN channels to transmit or convert the signal to the output 16. Alternately, the output TURN signals in 16 may be in synchronization with the input TURN signals in 14.

One of ordinary skill in the art will appreciate that other appropriate logic may be used to transmit or convert signals from the towing vehicle to the towed vehicle. Advantageously, the microcontroller 20 may also determine a short circuit or excessive load on the output 16 by reading the outputs of a current sense 26, as shown in FIG. 1. Any appropriate device, such as a sampling resistor or a printed circuit trace, may be used as the current sense 26.

For example, the microcontroller 20 may determine the amount of current in the load to determine the presence of an overload or a short circuit at the output 16. More specifically, the microcontroller 20 may compare the amount of current at the output 16, at a specific time after turning the corresponding output 16 ON, to a known current or a predetermined current at the output 16 to determine the presence of an excessive load or short circuit.

Based on the amount of current, the microcontroller 20 may control various components of the microcontroller 20. As an example, the microcontroller 20 may turn the output 30 off. The microcontroller 20 may then retry again after a predetermined time interval, for example, two (2) seconds, or the like. The microcontroller 20 may then resume normal operation if the microcontroller 20 does not detect an overload or short circuit after the retry.

In conserving power or otherwise controlling the trailer signal converter or adapter 10, the microcontroller 20 may monitor the voltage or the current from the power source of the signaling system. With further reference to FIG. 1, a current sensor 26 may be in communication with the microcontroller 20. The current sensor 26 may monitor the current transmitted to the output 16. The current sensor 26 may comprise, for example, a sampling resistor or a printed circuit trace. The current sensor 26 may also monitor the current prior to turning the channel on and after turning the channel on. Accordingly, the current sensor 26 may monitor the current to detect open, overload or short circuit conditions.

For example, some signaling systems of towing vehicles have some voltage present on the stoplight channel input even when the stop light channel input is not active. The stoplight channel and tail channel may use analog inputs. The threshold at which the analog inputs of these channels is recognized as active may be programmed into the microcontroller 20. Thus, in an embodiment, the stoplight input may only be recognized as active when the voltage exceeds a predetermined threshold. By determining the analog voltage level of the tail channel at the input 14, issues or problems with voltage drop along the input 14 may be identified and remedied.

The microcontroller 20 may further include memory. The memory may be of any appropriate type, such as Electrically Erasable Programmable Read-Only Memory (EEPROM). EEPROM is a type of non-volatile memory that may be used in computers and other electronic devices to store small amounts of data that must be saved when power is removed, e.g., calibration tables or device configuration. The EEPROM may be used for calibration of the current on each channel of the input 14 and/or the output 16. Since the current sensor 26 detects current, the current sensor can be calibrated and the calibration factor may be stored on the memory of the microcontroller 20. The memory of the microcontroller 20 may store software or other logic to operate the trailer signal converter or adapter 10.

In an embodiment, temperature sensor 28 may provide temperature sensing by, for example, use of a thermistor, such as a Negative Temperature Coefficient (NTC) thermistor. In a NTC thermistor, the resistance may decrease with increasing temperature. The temperature sensing 28 may be a separate component(s) to the microcontroller 20 and may be located at a different and even multiple locations on the adapter 10. For example, the temperature sensor 28 may be located adjacent to the tail output drive of 30.

The temperature may be used by the microcontroller 20 in determining whether to turn the power off at the output 16, whether to limit the power at the output 16, such as by pulse-width modulation (PWM) or any other appropriate method known to one or ordinary skill in the art, or whether to take some sort of other action. The channels at the output 16 may reactivated or otherwise be turned back on when the temperature returns to a safe value or drops below a predetermined value. The current and voltage may be sensed at a predetermined time after first transmitting the power to the output 16. The temperature may be sensed periodically.

In some towing vehicles, for example, PWM may be used on the tail channel so that the same light can be used on the stoplight channel and the tail channel. The stoplight may turn ON with continuous voltage, whereas the tail may be turned ON using PWM to reduce the intensity of the light. Also, some towing vehicles use pseudo-multiplex signals that require decoding or conversion back to conventional signals to drive the towed vehicle signaling system.

In an embodiment, the microcontroller 20 may detect the PMW/pseudo-multiplex scheme on the channels of the input 14 and drives of the outputs 16 for the signaling system of the towed vehicle. The towed vehicle may use same light for turn and tail channels. With reference to FIG. 1, the microcontroller 20 may be programmed to send signals, such as PWM/pseudo-multiplex signals to the gate drive 24.

Depending on the signal transmitted by the input 14, the microcontroller 20 may activate or "turn on" a charge pump 22 to transmit signals to the output 16. In addition, the charge pump 22 may drive a gate drive 24, as illustrated in FIG. 1. In a preferred embodiment, the output drive 26 may be a N-channel Metal-Oxide-Semiconductor Field-Effect Transistor (MOSFET). A MOSFET is a device that may be used to amplify or switch electronic signals. The MOSFET may be composed of a channel of either N-type (N for negative) or P-type (P for positive) semiconductor material. A P-channel MOSFET may be used without a charge pump. The gate drive 24 may also control or switch the power to the output 16. The gate drive 24 may be composed of switching transistors semiconductor. One of ordinary skill in the art will appreciate that any other appropriate schemes and devices may be used in place of the gate drive 24 and charge pump 22. Keeping the MOSFET, current sense 26, and charge pump 22 separate may give an optimum performance in terms of power dissipation and detecting overload and short circuit on the output channel(s).

The output drive 30 may preferably have a low on resistance (RDSon) to dissipate power. As a result, heat generation may be maintained at a relatively low level. In an embodiment, the charge pump 22 may drive the gate drive 24 of the N-channel MOSFETs, such as in high-side driving, for example.

With reference to FIG. 1, the microcontroller 20 may be used to control the use of the charge pump 22 to conserve power when the trailer signal convert or adapter 10 does not require use of the charge pump 22. To keep the quiescent current low, the charge pump 22 may be turned on only when necessary. In an embodiment where the current sensor 26, the gate drive 24 and the charge pump 22 are separate components, the adapter 10 may maximize the performance related to power dissipation and detection of overload and short circuits on the output 16. In addition, the use of separate components may allow for tailoring and fine tuning of the adapter 10 to a specific use.

The gate drive 24 and the current sensor 26 may also be in communication with an output drive 30. The output drive 30 may be in communication with the output 16 in order to transmit the signals to the towed vehicle. The adapter 10 may have a circuit programming adapter 38 for communicating with the computer 40 to program the memory in microcontroller 20.

The embodiments of the invention have been described above and, obviously, modifications and alternations will occur to others upon reading and understanding this specification. The claims as follows are intended to include all modifications and alterations insofar as they come within the scope of the claims or the equivalent thereof.

Having thus described the invention, the following is claimed:

1. A signal converter comprising:
    a power supply;
    a microcontroller connected to said power supply, said microcontroller configured to receive a plurality of input signals related to lamp lights of a first vehicle from said first vehicle, and output a plurality of output signals related to one or more vehicle lamp light loads of a second vehicle;
    a current sensing device connected to said microcontroller to monitor current flow at said loads; and
    wherein, said microcontroller is capable of reducing the duty cycle of one or more of said output signals in response to said current flow rising above a first predetermined threshold.

2. The signal converter of claim 1, wherein said microcontroller is capable of receiving a signal from said first vehicle containing information related to two or more parameters of said first vehicle, decoding the signal, and outputting a signals to said second vehicle related to at least one of said two or more parameters of said first vehicle.

3. The signal converter of claim 2, wherein said signal from said first vehicle containing information related to two or more parameters is a multiplex signal.

4. The signal converter of claim 3 further comprising a temperature sensor connected to said microcontroller to monitor and report the temperature of said signal converter to said microcontroller.

5. The signal converter of claim 4, wherein said microcontroller is capable of reducing the duty cycle of said output signal in response to said temperature rising above a first predetermined temperature and resuming said output signal to full strength once said temperature falls bellow a second predetermined threshold.

6. The signal converter of claim 5, wherein said current sensing device monitors and reports the current level only while said output signal is being sent to said load.

7. The signal converter of claim 6 further comprising a charge pump connected to said microcontroller to drive said output signal.

8. The signal converter of claim 7, wherein said charge pump, said temperature sensor, and said current sensor are each separate circuit components.

9. The signal converter of claim 8, wherein said temperature sensor is a thermister.

10. The signal converter of claim 2, wherein said signal from said first vehicle containing information related to two or more parameters is a pulse-width modulation signal.

11. The signal converter of claim 2, wherein said two or more parameters include a stoplight signal and a taillight signal.

12. The signal converter of claim 1, wherein reducing the duty cycle of one or more of said output signals includes reducing the frequency of one or more of said output signals.

13. The signal converter of claim 1, wherein said microcontroller is capable of resuming said one or more output signals to full strength once the current flow falls below a second predetermined threshold.

14. A signal converter comprising:
a power supply;
a microcontroller connected to said power supply, said microcontroller including a plurality of input channels to receive input signals related to vehicle lights from a first vehicle, and a plurality of output channels to send output signals related to vehicle lamp loads to one or more output devices of a second vehicle;
wherein, said output channels are configured to stagger activity on said output signals.

15. The signal converter of claim 14, wherein said microcontroller is capable of receiving a multiplex signal from said first vehicle containing information related to two or more parameters of said first vehicle, and outputting a discrete signals to said second vehicle related to at least one of said two or more parameters of said first vehicle.

16. The signal converter of claim 15 further comprising a temperature sensor connected to said microcontroller to monitor the temperature of said signal converter.

17. The signal converter of claim 16, wherein said microcontroller is capable of reducing the power of said output signal in response to said temperature rising above a first predetermined temperature and resuming the output signal to full strength once said temperature falls bellow a second predetermined threshold.

18. The signal converter of claim 17, wherein said microcontroller limits the power of said output signal by reducing the duty cycle of said output signal.

19. The signal converter of claim 18, wherein reducing the duty cycle of said output signal includes reducing the frequency of said output signal.

20. The signal converter of claim 17, wherein said microcontroller limits the power of said output signal by turning off said output signal.

21. The signal converter of claim 17, further comprising a charge pump to drive said output channels.

22. The signal converter of claim 14, wherein said microcontroller is capable of receiving a pulse-width modulation signal from said first vehicle containing information related to two or more parameters of said first vehicle, and outputting a plurality of discrete signals to said second vehicle related to said two or more parameters of said first vehicle.

23. The signal converter of claim 14, further comprising a current sensing device connected to said microcontroller to monitor the current drawn by said output devices.

24. The signal converter of claim 23, wherein said microcontroller is capable of limiting the power of said output signals in response to said current draw rising above a first predetermined threshold, and resuming the output signal to full strength once the current draw falls below a second predetermined threshold.

25. The signal converter of claim 23, wherein said microcontroller is capable of staggering the activity on said output signals in response to a short or overload condition on the output channel.

26. A method of converting a signal comprising:
receiving an input signal related to a vehicle light from a first vehicle at an input channel of a microcontroller on a signal converting device;
sending an output signal related to a vehicle lamp light load to an output device of a second vehicle from an output channel of said microcontroller in response to said input signal;
measuring current flow at said load while said output signal is being sent to determine the presence of a circuit fault;
measuring the temperature of said signal converting device;
reducing the power of said output signal in response to a circuit fault or in response to said temperature rising above a first predetermined threshold; and
restoring said output signal to full strength once said circuit fault is removed and said temperature is below a second predetermined threshold.

27. The method of converting a signal of claim 26, wherein said circuit fault includes a short circuit and a current overload.

28. The method of converting a signal of claim 27, wherein the power of said output signal is limited in response to a circuit fault or in response to said temperature rising above a first predetermined threshold by reducing the duty cycle of said output signal.

29. The method of converting a signal of claim 28, wherein the power of said output signal is limited in response to a circuit fault or in response to said temperature rising above a first predetermined threshold by turning said output channel off.

30. The method of converting a signal of claim 28, wherein reducing the duty cycle of said output signal includes reducing the frequency of said output signal.

31. A signal converter comprising:
a power supply;
a microcontroller connected to said power supply, said microcontroller configured to receive an input from a first vehicle related to a vehicle lamp light, and transmit at least one output signal related to a vehicle lamp load to one or more loads of a second vehicle;

wherein said input signal from said first vehicle contains information related to two or more parameters of said first vehicle; and wherein said microcontroller is capable of decoding said input signal and outputting a signal to said second vehicle related to at least one of said two or more parameters of said first vehicle.

32. The signal converter of claim 31, wherein said two or more parameters include a stoplight signal and a taillight signal.

33. The signal converter of claim 31, wherein said input signal is a multiplex signal.

* * * * *

UNITED STATES PATENT AND TRADEMARK OFFICE
CERTIFICATE OF CORRECTION

PATENT NO. : 8,179,142 B2
APPLICATION NO. : 12/381340
DATED : May 15, 2012
INVENTOR(S) : Chandrakumar Kulkarni and Joseph B. Wells It is certified that error appears in the above-identified patent and that said Letters Patent is hereby corrected as shown below:

In the Claims

Column 6, line 65, delete "signals" and insert --signal--

Column 7, line 12, delete "bellow" and insert --below--

Signed and Sealed this
Eighth Day of July, 2014

Michelle K. Lee
*Deputy Director of the United States Patent and Trademark Office*